J. A. POSEY.
NUT LOCK.
APPLICATION FILED JULY 1, 1909.
961,371.
Patented June 14, 1910.
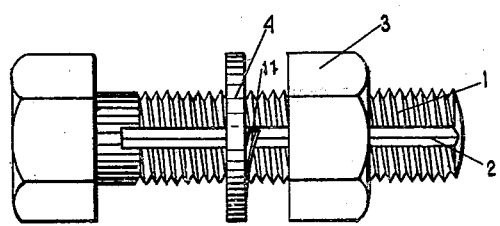
Fig. 1.
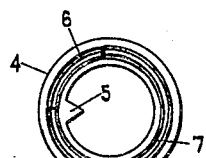 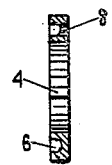 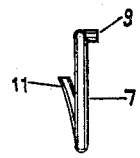
Fig. 2.  Fig. 3.  Fig. 4.
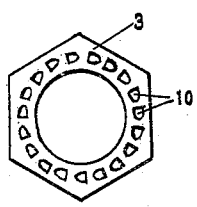 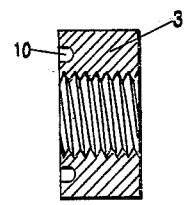
Fig. 5.  Fig. 6.
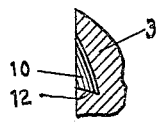
Fig. 7
WITNESSES:
L. McDonald
J. O. Murray
INVENTOR
J. A. Posey
BY John M. Spellman
ATTORNEY

UNITED STATES PATENT OFFICE.

JAMES A. POSEY, OF WAXAHACHIE, TEXAS.

NUT-LOCK.

961,371. Specification of Letters Patent. Patented June 14, 1910.

Application filed July 1, 1909. Serial No. 505,329.

*To all whom it may concern:*

Be it known that I, JAMES A. POSEY, citizen of the United States, residing at Waxahachie, in the county of Ellis and State of Texas, have invented certain new and useful Improvements in Nut-Locks, of which the following is a specification.

My invention relates to new and useful improvements in nut locks. Its object is to provide a nut lock, which, when the nut is in place upon its bolt, will prevent the same from working or jarring loose, holding it securely against rotation.

A further object is to provide a nut lock, involving as few parts as possible, and one which may be manufactured cheaply, requiring comparatively little machine work.

Finally, the object of the invention is to provide a device of the character described that will be strong, durable, simple and efficient, and also one in which the parts will not be likely to get out of working order.

With these and other objects in view, my invention has relation to certain novel features of construction, an example of which is described in the following specification and illustrated in the accompanying drawing, wherein:

Figure 1 is a side view of a bolt with nut and washer thereon, as modified in my invention. Fig. 2 is a front view of the washer employed, showing a spring wire pawl embedded in a groove therein and the triangular tongue adapted to slide in a similarly shaped groove in the bolt. Fig. 3 is a sectional transverse elevation of the same the pawl being omitted. Fig. 4 is a side view of said spring wire pawl. Fig. 5 is a view of the rear face of the nut, showing the indentures therein, adapted to receive the extremity of said pawl. Fig. 6 is a transverse sectional elevation of the same. Fig. 7 is a detail section, taken longitudinally through one of said indentures, showing the shape thereof in elevation.

Referring now more particularly to the drawings, wherein like numerals of reference designate similar parts in all the figures, the numeral 1 denotes a threaded bolt, differing from ordinary bolts only in that it has a triangular groove 2 extending longitudinally of its threaded portion. A nut 3 and a washer 4 are shown in Fig. 1 in position upon this bolt, the triangular tongue 5 of the washer preventing the same from rotating by engaging in the groove 2 of the nut. In the face of the washer adjacent to the nut an annular groove 6 is provided of sufficient depth to receive the spring wire pawl 7 embedded therein. An aperture 8 is provided in this groove, extending transversely through the washer and is adapted to receive the downturned extremity 9 of the pawl 7.

A plurality of indentures 10 are provided in the surface of the nut 3 upon the face thereof adjacent to the washer, and are adapted to receive the upturned extremity 11 of the pawl, when the nut is threaded up against the washer. As clearly shown in Fig. 7, these indentures are of such a shape as to permit the pawl to slip over them while the nut is being tightened upon the washer, but prevent the removal of the nut, owing to the abutment of the pawl against the shoulder 12.

It is obvious that the nut can neither work loose nor be easily removed by hand when made contiguous with the washer, the latter being restricted against displacement on the bolt. To remove the nut, the use of a wrench is necessary and sufficient force is requisite to cause the upper edge of the shoulder 12 to shear off the extremity 11 of the pawl. Thus the nut lock is protected from the tampering of irresponsible persons as well as against accidental loosening.

The annular groove 6 will preferably be provided with a semi-circular bottom, to which the wire pawl will adapt itself. This nut lock is applicable to any bolt and nut fastening where it is desired to safe-guard the nut against unthreading.

I am aware that changes may be made in the form and proportion of parts and details of the device herein-described as a preferable embodiment of my invention without departing from the spirit or sacrificing the advantages thereof, and I therefore reserve the right to make such changes and alterations in said device as fairly come within its scope.

What I claim is:

1. In a nut lock, the combination with a bolt, provided with a longitudinal, triangular groove in its threaded portion, of a washer provided with a triangular tongue projecting from its inner face adapted to enter said groove, and having an annular groove in its lateral face, and an aperture extending transversely therethrough communicating with said groove, a spring pawl positioned in said groove, one of whose extremities is socketed in said aperture and the other of whose extremities is slightly upturned, projecting from the groove, and a nut threaded upon the bolt, upon the rear face of which a plurality of indentures is provided, said indentures having an undercut shoulder at one end and a sloping side at the other.

2. In a nut lock, the combination with a bolt provided with a longitudinal groove, of a washer having a tongue adapted to enter said groove, and provided with an annular groove upon its side, a spring wire pawl embedded in the last named groove, and fixed against rotation at one extremity, the other extremity being slightly upturned, and a nut, the inner surface of which is provided with a plurality of indentures forming a circle, each indenture having an undercut shoulder at one end and a sloping side at the other.

In testimony whereof I have signed my name to this specification in the presence of two subscribing witnesses.

JAMES A. POSEY.

Witnesses:
BOWD FARRAR,
Y. D. KEMBLE.